Sept. 13, 1938.    J. H. DOAK    2,130,177
METHOD FOR MANUFACTURING HOLLOW RUBBER ARTICLES
Filed May 6, 1936
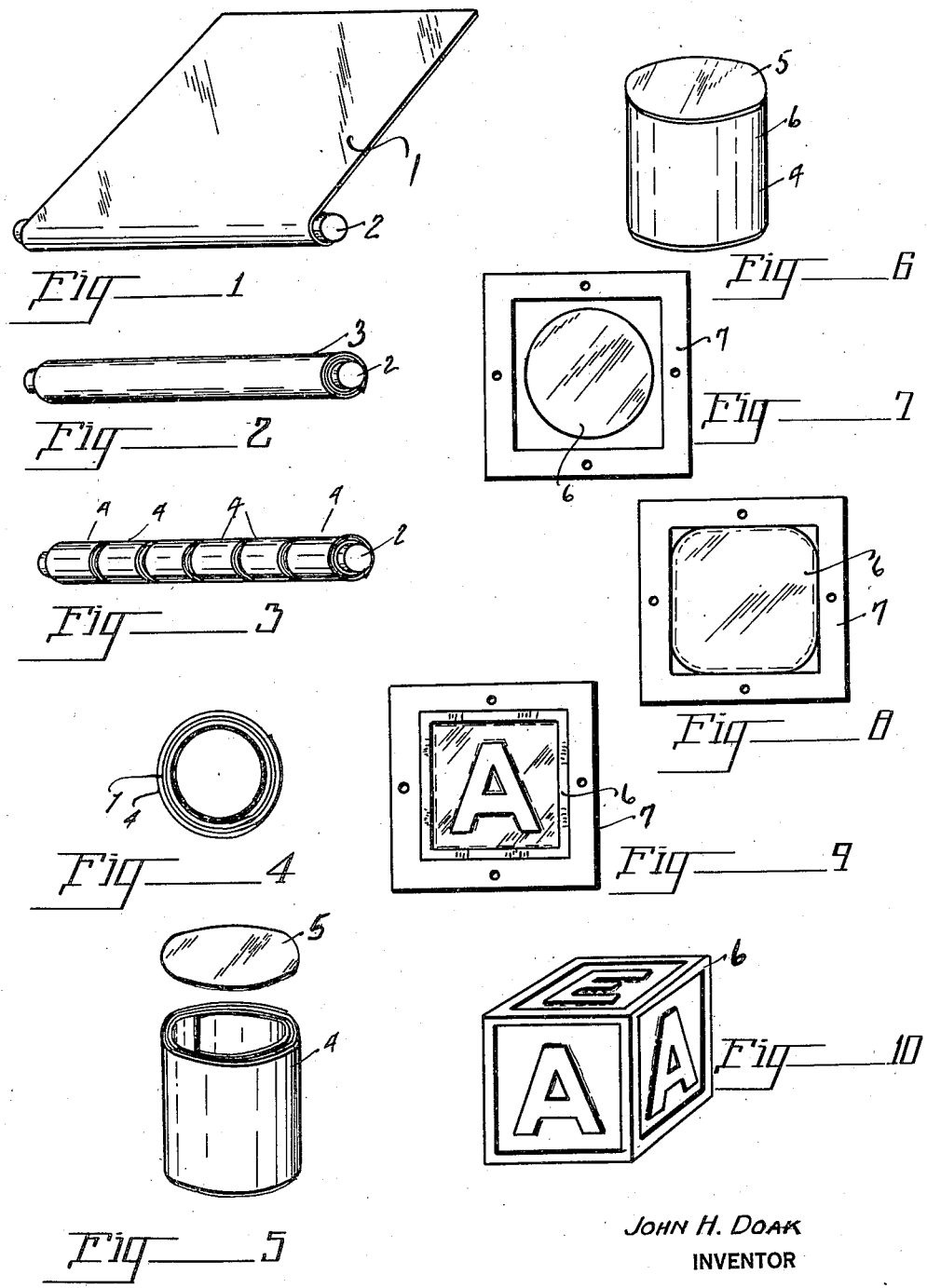
JOHN H. DOAK
INVENTOR
BY Clive Hartson
ATTORNEY Patented Sept. 13, 1938

2,130,177

UNITED STATES PATENT OFFICE 2,130,177

METHOD FOR MANUFACTURING HOLLOW RUBBER ARTICLES

John H. Doak, Portland, Oreg.

Application May 6, 1936, Serial No. 78,105

4 Claims. (Cl. 18—59)

My invention relates to an improved method for manufacture of hollow rubber articles, and chiefly concerns itself with the preparation of such articles previous to molding. In molding such articles, one practice is to provide a hollow rubber body which is placed in a suitable mold. Thereafter or at the same time a suitable chemical is placed in the interior of the body which chemical under the influence of heat forms a gas. The gas forces the walls of the body against the walls of the mold, which mold is heated during this process, thereby causing the exterior of the body to assume the form outlined by the mold in which form it is cured or vulcanized.

A common practice in forming the rubber body prior to molding is to cut blanks from strip or sheet rubber compound, seal the several parts together to provide such body and then place in a mold. My invention departs from this practice in that I wrap a sheet of rubber compound about a mandril and thereafter cut such wrapped rubber into sections. These sections are removed from the mandril, and when so removed are in the form of tubes. A cap or cover is secured to each end of each cylindrical body thus transforming each into a hollow body ready for the mold. Thereafter they are placed in a mold and molded to the desired shape, and expanding gas in the interior of the bodies, formed through heat action upon a chemical previously introduced into such bodies, forcing the walls of the bodies against the walls of the molds.

In the drawing, Figures 1, 2 and 3 are diagrammatically illustrative of three consecutive steps in forming a hollow body of rubber compound. Figure 4 is an end view of a rubber tubular body with the end caps not yet attached. Figure 5 is a side elevation of a tubular body showing a cap or end member to be placed at one end thereof. Figure 6 is similar to Figure 5 with the exception that the dap or end member has been secured to the end of the tubular member. Figures 6, 8, and 9, are plan views of a mold for molding the body and show respectively the body when first placed in the mold, the body during an intermediate period of the molding thereof, and the body after the molding has been completed. Figure 10 is a perspective of a rubber play block molded from a hollow body of rubber compound.

In the drawing, similar characters refer to similar parts throughout the several views.

The present invention concerns itself primarily with the forming of a hollow body of rubber compound which may subsequently be placed into a mold and molded into the desired form. For the purpose of forming such bodies I employ sheets of suitable rubber compound. The composition of such sheets being in the well developed art of manufacture of rubber articles need not be discussed here. The thickness of such sheet is variable in accordance with the requirement of the articles being manufactured. In the present instance the manufacture of rubber play blocks is illustrated, but merely for illustration only as the invention is not limited to the manufacture of such articles. In the manufacture of such articles, the thickness of the rubber sheets or strips may be between one-thirty-second- and one-sixteenth of an inch. A sheet of such thickness is illustrated in Figure 1 by the numeral 1. The width of the sheet is equal or greater than the length of a rubber body. In the illustration it is equal to the combined length of six such bodies. This sheet is wound upon a mandril 2 to form a tubular body 3. The number of laps to be wound upon the mandril varies in accordance with the thickness required in the side walls of the body. Where thick walls are required a greater number of laps are employed than where thin walls will be satisfactory. After the sheet has been wound upon the mandril and the tubular body 3 has been formed, this body is cut into a number of sections 4 and thereafter these sections are removed from the mandril. The length of each section is substantially that of a completed body. It will be seen by arranging the sheet in a number of laps, the imperfect portions of one lap will in all probability be covered by the perfect portions of other laps, assuming that such sheet has weakened or imperfect portions which have not been noticed. This will ensure that the walls of the body will be substantially air or gas tight.

The section 4, which is a tubular body, forms the major portion of the completed hollow body. To complete such body each end of the section is capped by caps 5. These caps are of material like or similar to the material composing the sheet 1, and are secured to the ends of the section by any suitable means, as for instance, by pressure or tooling. The addition of the caps completes the body, which completed body is indicated by numeral 6. After the body 6 has been completed it is placed in a mold. The numeral 7 broadly indicates such mold. Prior to capping the body a suitable chemical which under the influence of heat will form a gas which will expand the body 6. After the mold has been closed and heat applied thereto, the chemical expands the body and forces the walls thereof against the walls of the mold, at the same time the heat cures or vulcanizes the rubber compound uniting the caps and body into one integral whole. The mold herein illustrated is employed to form rubber play blocks, though other types of molds are employed where it is desired to produce other articles. The expansion of the body 6 causes it to assume the shape outlined by the mold, a cubical block in this instance. Figures 7, 8, and 9, illustrate respectively, the body 6 when first placed in the mold, an intermediate stage in molding the block, and the completion of the molding process. The intermediate stage shows how the body 6 changes from a cylindrical shape, the corners being somewhat rounded, to a cubical shape.

While specific steps in the practice of the method have been described and illustrated herein, it is desired to be understood that the same may be varied, within the scope of the appended claims, without departing from the spirit of the invention.

Having described my invention, I claim—

1. The art of manufacturing hollow uncured rubber bodies for molding which comprises the rolling of a sheet of rubber compound upon a mandril, cutting the rolled sheet into sections of the desired length, and finally capping the ends of each section with a rubber cap.

2. The art of manufacturing hollow uncured rubber bodies for molding which comprises the forming of a cylinder from sheet rubber compound, cutting the cylinder into sections, and finally capping each section.

3. The art of manufacturing hollow uncured rubber bodies for molding which comprises forming a cylinder from layers of sheet rubber compound, dividing the cylinder into sections, and finally closing the ends of each section with rubber compound.

4. The art of manufacturing hollow uncured rubber bodies for molding which comprises forming a cylinder from a sheet of rubber compound arranged in layers and then closing the ends of the cylinder with rubber compound.

JOHN H. DOAK.